United States Patent Office 2,946,659
Patented July 26, 1960

---

2,946,659

PRODUCTION OF NEW SULFURIC ACID FROM WASTE PICKLE LIQUOR

Charles B. Francis, Pittsburgh, Pa., assignor to Puriron and Chemicals, Inc., a corporation of Pennsylvania No Drawing. Filed May 15, 1958, Ser. No. 735,393

4 Claims. (Cl. 23—172)

---

My invention relates to the production of sulfuric acid from ferrous sulfate, and consists in certain new and useful improvements in pre-existing methods for the purpose.

The invention is particularly directed to the treatment of ferrous sulfate salvaged from waste sulfuric pickle liquor, that is, the liquor remaining when the sulfuric acid used in the pickling of articles of iron and steel has become exhausted to the point where new acid is required.

The art is familiar with the several processes in which the ferrous sulfate in solution in waste pickle liquor may be abstracted in particulate solid form from the liquor, whereby the free acid remaining in the liquor may be returned to the pickling vats or tanks for re-use. The term "free acid" means $H_2SO_4$ which is chemically uncombined with any of the metals that form the articles that have been pickled. The $SO_4$ radical in the recovered ferrous sulfate ($FeSO_4$) represents what may be termed the "combined acid," as distinguished from "free acid" in the liquor, and it is this combined acid which I seek to convert into new acid. It has been known that this can be done, but so far as I am aware all known methods are so costly as to render them commercially impractical.

Ferrous sulfate may be readily decomposed, yielding ferric oxide, sulfur dioxide and sulfur trioxide. The sulfur dioxide may be oxidized to form sulfur trioxide, which, together with the sulfur trioxide directly released from the sulfate, may be reacted with water to form sulfuric acid. The oxidation of sulfur dioxide to form sulfur trioxide requires a catalyst, or its equivalent, and this imposes a cost factor of impractical proportion, since the proportion of sulfur dioxide to sulfur trioxide obtained by the decomposition of ferrous sulfate is relatively high. As a result the production of sulfuric acid from ferrous sulfate has been prohibitive, or non-competitive with other processes in America at the present time.

The existing municipal and State laws against stream pollution have presented those industries which generate waste pickle liquor with the serious problem of how to dispose of the liquor in such way that stream pollution and atmosphere pollution are avoided. Various methods of neutralizing waste liquor for disposal are known and practiced, but the cost of neutralizing, transporting and dumping is excessive. In a large steel plant with which I am familiar it costs two cents a gallon to make lawful disposition of pickle liquor. This plant, under normal business conditions, generates 50,000 gallons of waste liquor per day, wherefore the cost of liquor disposal substantially exceeds $300,000.00 per year.

In some cases the waste pickle liquor has been processed for the recovery of ferrous sulfate and free sulfuric acid, but the capital investment for the facilities to do this, plus the cost of labor, fuel, etc., results in a loss of about one cent per gallon of liquor treated, after crediting the market value of the sulfate and acid recovered.

The object of my invention is to provide for the production of sulfuric acid from ferrous sulfate, particularly if not exclusively ferrous sulfate recovered from waste pickle liquor, in such way that the costs are minimized and the disposal or treatment of waste sulfuric pickle liquor becomes a profitable rather than a losing industrial practice. Other objects of the invention are inherent and will be apparent in the following specification:

Since the several methods of recovering particulate ferrous sulfate from waste pickle liquor are known to the art, it is needless to involve this description with them. It will suffice for an understanding of the invention to say that particulate ferrous sulfate in either crystalline or amorphous form is moistened with free sulfuric acid of such concentration that the sulfate is insoluble in the acid at 212° F. It has been found that acid of 50% concentration by weight serves the purpose. If there is free or combined water in the sulfate, or free acid of less than 50% concentration, the concentration of the acid added to the sulfate will be such that the final or averaged acid concentration will at least equal the said 50%. The weight of the acid in the mixture should be approximately 17% at least of the weight of the ferrous sulfate on a dry basis; that is, the weight of 50% acid should be substantially 34% of the weight of the ferrous sulfate on the dry basis.

This moist mixture or slurry of ferrous sulfate and free acid is heated and dehydrated in the presence of a heated oxygen-containing gas, such as air. The temperature of the material is gradually raised and maintained for a time at a value above 212° F. and less than that at which the sulfuric acid is volatilized, which is 275° F. for 50% acid, and 538° F. for 93% acid. While undergoing heating the material is agitated in such fashion that the heat is imparted to the individual particles of the sulfate, to drive off the water from the sulfate and acid mixture and to allow the heated air to enter a disseminated intimate contact with the acid and sulfate. In this procedure basic ferric sulfate is produced as follows:

Reaction 1

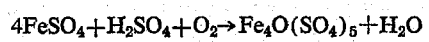

$$4FeSO_4 + H_2SO_4 + O_2 \rightarrow Fe_4O(SO_4)_5 + H_2O$$

The particular form of the apparatus for thus producing basic ferric sulfate is a matter of engineering selection. I have successfully used an inclined rotating drying and comminuting kiln of the sort shown in my copending U.S. patent application, Serial No. 657,622, filed May 7, 1957, now Patent No. 2,927,016. The sulfate-acid mixture is fed into the upper end of the inclined kiln, and during its advance downwardly through the rotating kiln the mixture is heated to drive off all contained water. Through the lower end of the kiln air preheated to from 400 to 500° F. is delivered not only to carry the released water vapor without condensation out of the upper end of the kiln, but to permit the oxygen in the hot air to react with the acid in the mixture. As it advances through the inclined kiln the mixture is raised in contact with heated wall of the kiln, and then it is repeatedly dropped from the wall through the current of preheated air flowing through the kiln back into contact with heated kiln wall. In due course all of the water is driven off and basic ferric sulfate is produced in accordance with Reaction 1.

As further shown in my copending patent application, the kiln may be extended beyond the zone in which said reactions occur and provided with a plurality of tumbler bars which operate during kiln rotation to pulverize or comminute the basic ferric sulfate before it is discharged from the kiln. Alternately, any conventional ball mill may be provided to pulverize the basic ferric sulfate.

The pulverized basic ferric sulfate is then decomposed under the effect of heat ranging from 900 to 1450° F., as follows:

Reaction 2

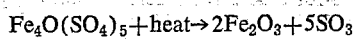
$$Fe_4O(SO_4)_5 + heat \rightarrow 2Fe_2O_3 + 5SO_3$$

A simple kiln, such as the heated disassociator kiln shown and described in my copending patent application, may serve the purpose, although other forms of apparatus within the knowledge of the chemical engineer may be used.

If the basic ferric sulfate is produced from ferrous sulfate recovered from spent pickling acid, rather than from commercially pure sulfate, there will be traces of organic material carried over from the inhibitors used in the pickling acid. It is significant that such organic material is oxidized and eliminated during the described decomposition of the basic sulfate, this effect being accomplished by the oxygen in the air which may be present during the decomposition step. If air does not reach intimate contact with any of the organic matter the sulfur trioxide reacts with the organic matter to form a charred powder and sulfur dioxide.

The sulfur trioxide produced in Reaction 2 is admixed in known way with water, to produce sulfuric acid, preferably sixty degree acid, a valuable commercial product. The ferric oxide ($Fe_2O_3$) produced by this decomposition of the basic ferric sulfate may be reduced to form iron of high purity, say sponge iron or powdered iron of high market value, as described in my said copending application.

It will be perceived, therefore, that, by practicaclly eliminating the production of sulfur dioxide in the disassociation of iron sulfate, the cost of converting the sulfur dioxide to sulfur trioxide is avoided. As a result the cost of producing sulfuric acid from ferrous sulfate becomes both practical and profitable. Furthermore, the treatment of waste sulfuric pickle liquor is reduced from a losing to a profitable undertaking, and an economic incentive for the elimination of stream pollution is created.

While I have produced sulfuric acid in exact accordance with the method described above, with no sulfur dioxide to contend with, I am aware that in large-scale mass production there may remain in the basic ferric sulfate produced certain small inclusions of ferrous sulfate, with the consequence that minor quantities of sulfur dioxide may be found in the sulfur trioxide yielded in the decomposing step of the method. But this is of little or no practical significance, since the mixture of air and hot sulfur oxides flowing from the disassociator may be passed in intimate contact with a catalyst, such as pelletized ferric oxide, and the small amount of sulfur dioxide converted to sulfur trioxide before the same is reacted with water to produce sulfuric acid. The cost of so converting the small quantities of sulfur dioxide is so inconsequential as not substantially to affect the economics of my improved method.

The art is familiar with the step of producing sulfuric acid from basic ferric sulfate, but all hitherto known methods of obtaining basic ferric sulfate for the purpose are relatively expensive and distinct from my improved method of obtaining such basic sulfate from the components of waste pickle liquor.

Within the terms of the appended claims many variations and modifications of the procedure described may be practiced without departure from the essence of my invention.

I claim:

1. The method of producing sulfuric acid which comprises heating particulate ferrous sulfate mixed with free sulfuric acid in such proportions that the acid equals at least 17% of the weight of the ferrous sulfate on the dry basis and at such concentration that said sulfate in the resulting mixture is insoluble in the acid at 212° F., subjecting the mixture to a current of an oxygen-containing gas to a temperature above 212° F. and below that at which the acid is volatilized, thereby evaporating substantially only water and producing dry basic ferric sulfate, thereafter heating the dry basic ferric sulfate to above its decomposition temperature to produce ferric oxide and sulfur trioxide, and then reacting the released sulfur trioxide with water to produce sulfuric acid.

2. The method of producing sulfuric acid which comprises heating particulate ferrous sulfate mixed with free sulfuric acid in such proportions that the acid by weight is at least 17% of the weight of the ferrous sulfate on the dry basis and at such concentration that said sulfate is insoluble in the acid at 212° F., subjecting the mixture to a current of an oxygen-containing gas to a temperature above 212° F. and below that at which the acid is volatilized, thereby evaporating substantially only water and producing dry basic ferric sulfate with inclusions of ferrous sulfate, thereafter heating the ferrous and basic ferric sulfates to above decomposition temperature to produce ferric oxide, sulfur trioxide and sulfur dioxide, passing the released sulfur dioxide and sulfur trioxide, together with an oxygen-bearing gas, into intimate contact with a catalytic agent for converting the sulfur dioxide to sulfur trioxide, and then reacting the sulfur trioxide with water to form sulfuric acid.

3. The method of treating waste pickle liquor that contains dissolved ferrous sulfate and free sulfuric acid, which method comprises effecting the precipitation of most of the ferrous sulfate in the liquor and, by the removal of acid and water from the liquor, producing a mixture in which the acid by weight is at least 17% of the weight of the ferrous sulfate on the dry basis and at such concentration that the sulfate is insoluble in the acid at 212° F., subjecting the mixture to a current of an oxygen-containing gas to a temperature above 212° F. and below that at which the acid is volatilized, thereby evaporating substantially only water and producing dry basic ferric sulfate, thereafter heating the dry basic ferric sulfate to above its decomposition temperature to produce ferric oxide and sulfur trioxide, and then reacting the released sulfur trioxide with water to produce sulfuric acid.

4. The method of treating waste pickle liquor that contains dissolved ferrous sulfate and free sulfuric acid, which method comprises effecting the precipitation of most of the ferrous sulfate in the liquor and, by the removal of acid and water from the liquor, producing a mixture in which the acid by weight is at least 17% of the weight of the ferrous sulfate on the dry basis and in such concentration that the sulfate is insoluble in the acid at 212° F., subjecting the mixture to a current of an oxygen-containing gas to a temperature above 212° F. and below that at which the acid is volatilized, thereby evaporating substantially only water and producing dry basic ferric sulfate with inclusions of ferrous sulfate, and thereafter heating the ferrous and basic ferric sulfates to above decomposition temperature to produce ferric oxide, sulfur trioxide and sulfur dioxide, passing the released sulfur dioxide and sulfur trioxide, together with an oxygen-bearing gas, into intimate contact with a catalytic agent for converting the sulfur dioxide to sulfur trioxide, and then reacting the sulfur trioxide with water to form sulfuric acid.

References Cited in the file of this patent

UNITED STATES PATENTS

| | | |
|---|---|---|
| 2,098,056 | McBerty | Nov. 2, 1937 |
| 2,255,445 | Clarkson | Sept. 9, 1941 |
| 2,304,178 | Keyes | Dec. 8, 1942 |
| 2,739,040 | Mancke | Mar. 20, 1956 |